United States Patent [19]

Patil et al.

[11] 4,359,002
[45] Nov. 16, 1982

[54] RAILWAY CAR CORNER POST

[75] Inventors: Babgaunda A. Patil; Bhaskara R. Mutyala; Harold M. Schilf, all of Birmingham, Ala.

[73] Assignee: Pullman Incorporated, Chicago, Ill.

[21] Appl. No.: 180,263

[22] Filed: Aug. 22, 1980

[51] Int. Cl.³ ............... B61D 17/04; B62D 25/08; B62D 27/02
[52] U.S. Cl. ................... 105/410; 105/404; 296/29
[58] Field of Search ............ 105/377, 378, 396, 402, 105/403, 404, 409, 410, 421, 423; 52/105, 282, 735; 296/29, 30; 410/129

[56] References Cited

U.S. PATENT DOCUMENTS

| | | | |
|---|---|---|---|
| 1,301,487 | 4/1919 | Murphy | 105/410 |
| 1,381,284 | 6/1921 | Cotton | 105/402 |
| 1,410,710 | 3/1922 | Murphy | 105/410 |
| 1,639,264 | 8/1927 | McMillen | 105/410 |
| 1,734,247 | 11/1929 | Eklind et al. | 105/410 |
| 2,187,776 | 1/1940 | Gallagher | 105/410 |
| 2,207,955 | 7/1940 | Thompson | 105/410 |
| 2,460,982 | 2/1949 | Gilpin | 105/410 X |
| 3,521,573 | 7/1970 | Johansson | 105/409 |
| 3,521,574 | 7/1970 | Johansson | 105/409 |
| 3,557,715 | 1/1971 | Johansson | 105/409 |
| 3,592,142 | 7/1971 | Miller | 410/129 |
| 3,718,100 | 2/1973 | Adler et al. | 105/378 |
| 3,750,352 | 8/1973 | Jones | 105/410 X |
| 3,774,552 | 11/1973 | Snyder et al. | 105/409 X |
| 3,824,931 | 7/1974 | Hutchinson | 105/404 |
| 3,866,546 | 2/1975 | Malo | 105/410 |
| 4,057,020 | 11/1977 | Halliar et al. | 105/377 |

Primary Examiner—Robert B. Reeves
Assistant Examiner—Howard Beltran
Attorney, Agent, or Firm—Richard J. Myers

[57] ABSTRACT

The subject invention relates to the corner construction of a railway car, wherein the end wall, vertical reinforcing plate, side wall corner post and side plate are arranged with associated parts in a manner permitting an assembly without rotation of the car during manufacture. The structure provided includes a rigid connector plate which is attached to the end wall and forms a sandwich type transition member for attaching a flanged end of the side wall sheet.

17 Claims, 5 Drawing Figures

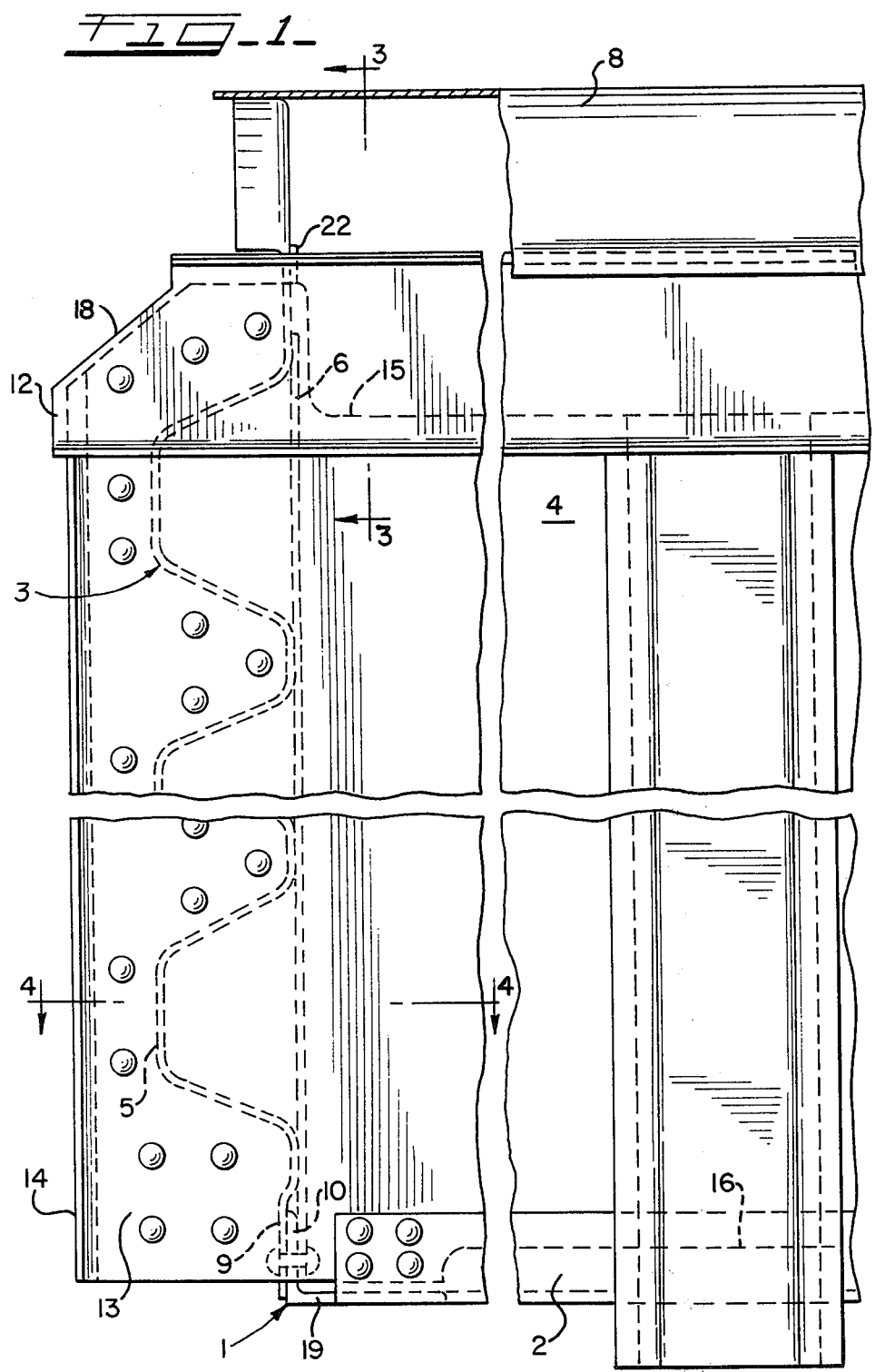

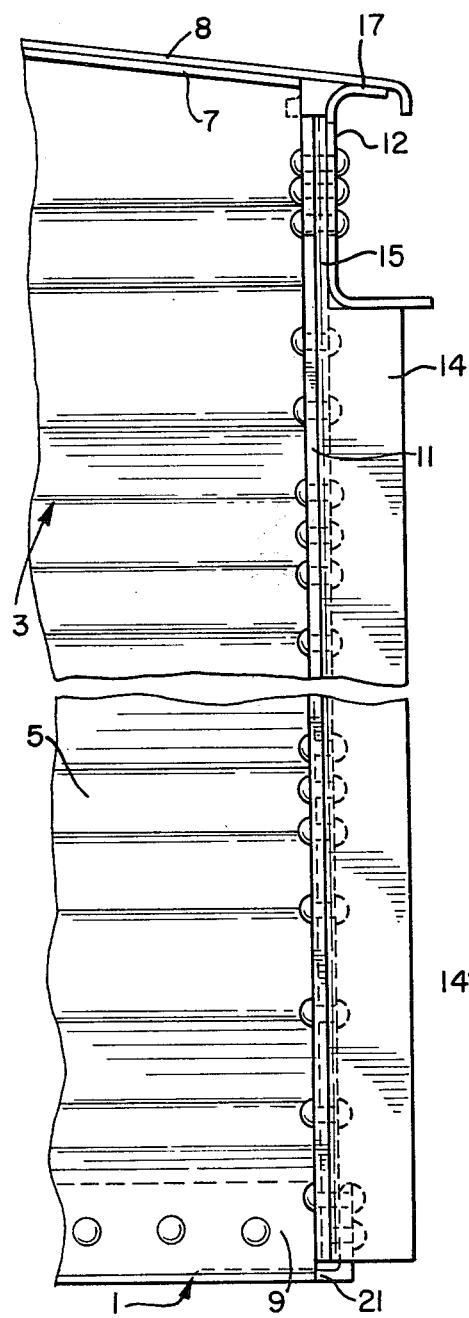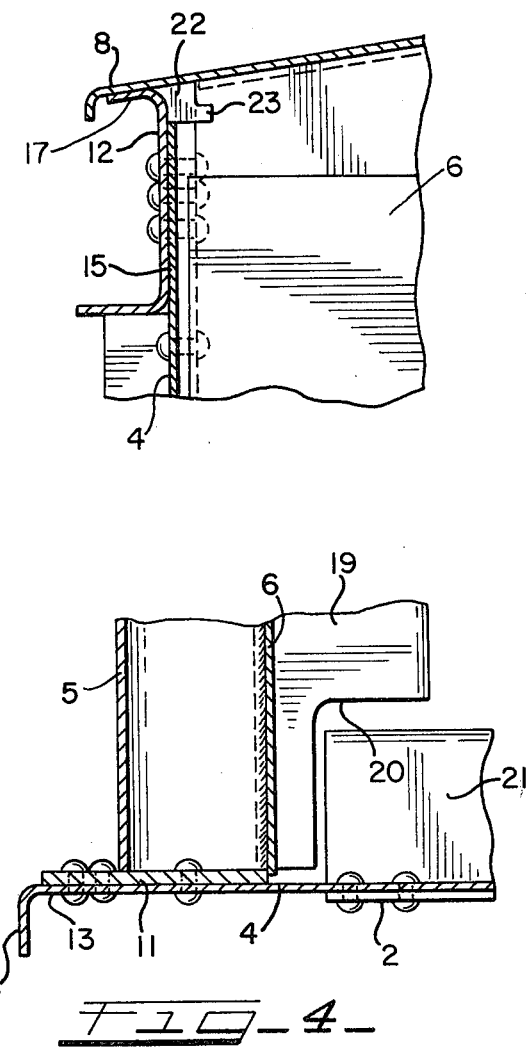

RAILWAY CAR CORNER POST

CROSS-REFERENCE TO RELATED PATENT APPLICATION

This application is related to the U.S. patent application being Ser. No. 180,262 filed Aug. 22, 1980.

BACKGROUND OF THE INVENTION

1. Field of the Invention

The present invention pertains to the field of railway car body design and particularly to end corner constructions.

2. Description of the Prior Art

Heretofor, various attempts have been made to provide a construction for a railway freight car corner post, which is easily fabricated and assembled and yet provides the necessary strength and durability for this highly stressed portion of the car body.

Jones U.S. Pat. No. 3,750,352 discloses a channel-shaped vertical corner post having longitudinally extending flanges to which the side sheathing of the car body is connected. Thompson U.S. Pat. No. 2,207,955 discloses a car end construction which comprises reversely channeled plates and spaced apart corner posts. Johansson, U.S. Pat. No. 3,557,715, discloses a railroad car end corner construction connecting the lower end of the side wall to the end wall of the car and it is specifically directed to a construction employing aluminum.

None of the above mentioned patents reflect the inventive concept disclosed in the subject invention which provides a simplified end corner construction which facilitates fabrication and assembly while providing the necessary rigidity.

SUMMARY OF THE INVENTION

A primary object of the present invention is to provide a simplified and easily assembled corner construction for a railway box car. The invention resides in a corner assembly comprising a side wall with an integrally formed corner post which includes a vertically extending terminal flange. A heavier, vertically extending reinforcing plate is assembled in abutment with and is welded to the end wall, the reinforcing plate being then mechanically fastened to the corner post. A channel-shaped side plate running along the top of and connected with the side wall is further connected to the reinforcing plate.

These elements of the corner structure make it possible to build a sturdy construction without rotation of the car body, which is normally required for the welding in a down hand position of a side sheet to a steel end having a box corner post. The end and side walls may be connected to each other in an upright position by any conventional mechanical fastening means.

These and other objects of the invention will become apparent to those having ordinary skill in the art with reference to the following description, drawings and claims.

BRIEF DESCRIPTION OF THE DRAWINGS

FIG. 1 is a partial side elevational view of an end portion of a railway car body;

FIG. 2 is a partial end view of a railway box car body;

FIG. 3 is a cross sectional view taken substantially along the line 3—3 of FIG. 1;

FIG. 4 is a cross sectional view taken substantially along line 4—4 of FIG. 1;

DESCRIPTION OF THE PREFERRED EMBODIMENT

Figure 5:
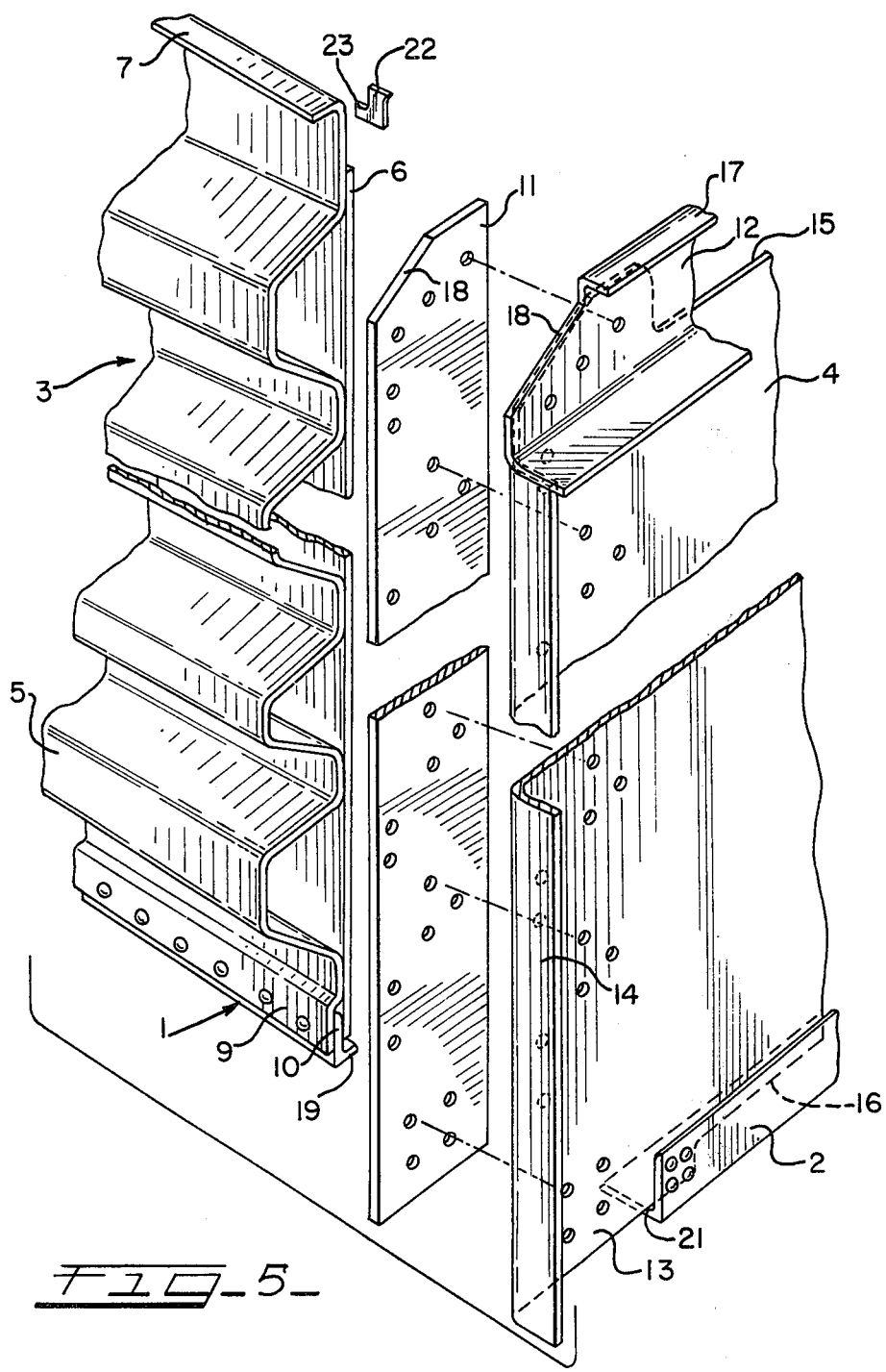
FIG. 5 is an exploded perspective view of a corner construction of a railway box car.

As best shown in FIGS. 1, 2 and 5, each of the corners of a railway car body comprises an underframe including end sill 1 and side sill 2, end wall 3 and side wall 4.

The end wall 3 comprises a plurality of vertically spaced and horizontally extending corrugations forming a sheathing 5, and a vertical end sheet or end lining 6 permanently attached thereto. An upper flange 7 extends perpendicularly outwardly from the sheathing 5 and is attached to a sloping roof sheet 8. The bottom, flattened end of sheathing 5 forms a vertical flange 9 outwardly offset from the end lining 6, thereby accommodating an upstanding flange 10 of end sill 1. Bottom sheathing flange 9, upstanding flange 10 of the end sill 1 and the bottom portion of the end lining 6 are contiguously secured to each other by any mechanical connecting means. The side portion of the sheathing 5 is abutted and secured to a vertical reinforcing plate 11.

As best shown in FIGS. 4 and 5, corner post 13, which may be either integral with or welded to side wall 4, extends transversely of the car and outwardly from the side wall 4. A vertical, terminal flange 14 extends laterally outwardly from the side wall 4. The side wall 4 has the recessed upper 15 and lower 16 portions intermediate of the corner posts 13. A channel-shaped side plate 12 extends longitudinally along the top of the side wall and has an upper flange 17 attached to the roof sheet 8. Side plate 12, corner post 13 and reinforcing plate 11, which are attached to each other in sandwich-like relation, each has a truncated upper corner 18. As best shown in FIG. 4, a horizontal flange 19 of the end sill 1 has a right angle cut out at the inner corner 20 thereby providing assembly space for the side sill horizontal flange 21. As shown in FIG. 3, a sheet metal hole filler 22 covers the opening in the upper corner of the end wall defined by the roof sheet 8, side plate 12, sheathing 5, top edge of the side wall corner portion 13 and reinforcing plate 11. The filler has a rectangular protrusion 23 for attachment purposes.

The present construction easily lends itself to assembly, when the car is in an upright position, utilizing huck bolts, rivets, bolts and nuts or similar fastening means. Therefore, the need to reposition the car body on its respective side during assembly in order to weld the end wall to the side wall in a down hand position, as is necessary in assembling a car body employing a box corner post construction, is eliminated. Consequently, saving in assembly time may be achieved.

What is claimed is:

1. A railway car corner construction comprising:
   a side wall having an upper portion, a roof sheet, and an end wall of said car, having a vertical corner post connected to the end wall,
   said corner post having a vertical terminal flange extending laterally outwardly from said side wall,
   a vertical reinforcing plate affixed between the end wall and said side wall corner post,
   a side plate connected to the upper portion of said side wall and to said roof sheet and further having end means connected to said reinforcing plate to rigidly interconnect said side plate with said end wall, said end wall including an end sill having a horizontal flange which includes cutout means for providing assembly space for said car corner construction.

a sheet metal filler covering an opening deferred by said roof sheet, a top edge of said corner post, said side wall upper portion, and said end wall, and said sheet metal filler having a protrusion extending inwardly to the car center facilitating attachment.

2. A railway car corner construction in accordance with claim 1, said side plate being of channel-shape having an upper flange thereof running along the upper portion of the side wall and above said vertical terminal flange.

3. A railway car corner construction in accordance with claim 1, said side plate has a vertical web attached to said side wall and horizontal flanges extending outwardly from said side wall, a top flange of said side plate is tilted downwardly under an angle corresponding to a slope of said car roof sheet and secured thereto.

4. A railway corner car construction in accordance with claim 3, said side plate having upper corners truncated downwardly from the roof sheet of the car.

5. A railway car corner construction in accordance with claim 1, and said vertical reinforcing plate is contiguously abutted to one side end of said end wall and to a corner portion on another side.

6. A railway car corner construction in accordance with claim 1, wherein said end wall includes sheathing, and said reinforcing plate being integrally united with one side end of said end wall sheathing.

7. A railway car corner construction in accordance with claim 1, and said reinforcing plate, corner post and side plate are secured to each other in sandwich-like relation by mechanical fastening means.

8. A railway car corner construction in accordance with claim 1, said end wall comprising a sheathing and an integrally affixed thereto end lining.

9. A railway car corner construction in accordance with claim 8, and said sheathing having a plurality of vertically spaced and horizontally extending corrugations.

10. A railway car corner construction in accordance with claim 8, and an upper portion of said corrugation sheathing comprising a vertical flat portion and a horizontal flange extending outwardly therefrom, said horizontal flange is contiguous with and connected to said roof sheet.

11. A railway car corner construction in accordance with claim 8, said end lining having a bottom edge attached to an end sill.

12. A railway car corner construction in accordance with claim 1, and a bottom end of said corrugation sheathing having a flattened vertical flange outwardly offsetting from said end lining thereby engagingly overlying said end sill and is secured thereto.

13. A railway car corner construction in accordance with claim 12, and said bottom flattened vertical flange, vertical flange of said end sill and bottom portion of said end lining are fastened to each other in sandwich relation.

14. A railway car corner construction in accordance with claim 1, angle shaped end and side sills have horizontal flanges extended inwardly of the car and vertical flanges being attached to end and side walls respectively by mechanical fastening means, said horizontal flange of said end sill has a right angle cut-out of an inner corner to accommodate a side sill horizontal flange.

15. A railway car corner construction in accordance with claim 1, and said side wall having a top edge running slightly above a bottom horizontal flange of said side plate, and contiguous with a web thereof, between corner portions and slightly below a side plate top flange in said corner portions.

16. A railway car corner construction in accordance with claim 15, and said corner post, reinforcing plate and side plate contiguously secured to each other by any mechanical fastening means having a common upper corner being truncated downwardly and outwardly from said end wall.

17. A railway car corner construction in accordance with claim 1, and said side wall including a portion contiguous with and secured to a vertical flange of said side sill, and said side wall having a bottom edge slightly raised within boundaries of said vertical flange.

* * * * *